Figure 1:
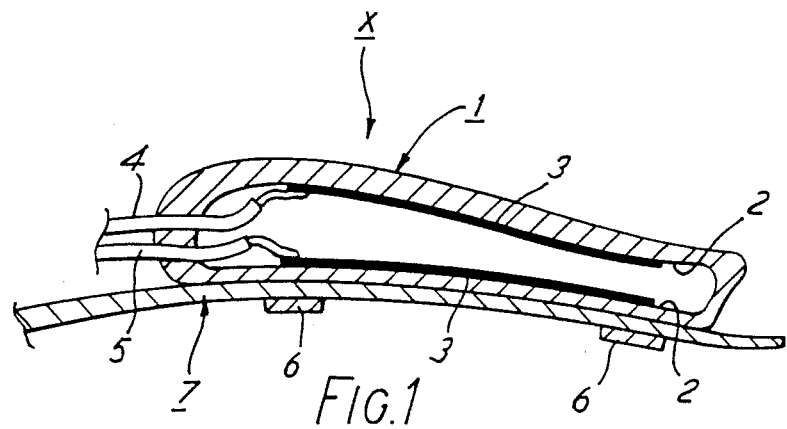

United States Patent [19]

Hargreaves

[11] Patent Number: 4,821,020
[45] Date of Patent: Apr. 11, 1989

[54] CYCLE STOP-LIGHT SWITCHES AND STOP-LIGHT EQUIPMENT

[76] Inventor: Karl M. Hargreaves, 60 Braemor Road, Calne, Wiltshire SN 11 9DU, United Kingdom

[21] Appl. No.: 545,443

[22] Filed: Oct. 26, 1983

[30] Foreign Application Priority Data

Oct. 27, 1982 [GB] United Kingdom ............... 8230912

[51] Int. Cl.[4] ............................................. B62J 3/00
[52] U.S. Cl. .................................. 340/432; 340/479; 200/52 R; 200/61.12
[58] Field of Search ............. 200/61.12, 61.27, 52 R, 200/61.85, 61.87; 340/69, 134; 74/488

[56] References Cited

U.S. PATENT DOCUMENTS

| 2,367,441 | 1/1945 | Schwinn | 200/61.12 |
| 3,521,233 | 7/1970 | Inoue | 200/61.12 |
| 4,275,280 | 6/1981 | Yamazaki | 340/134 |
| 4,281,229 | 7/1981 | Poleschuk | 200/52 R |

FOREIGN PATENT DOCUMENTS

| 1019666 | 1/1953 | France | 340/134 |
| 435339 | 5/1948 | Italy | 340/134 |
| 469883 | 12/1952 | Italy | 340/134 |
| 87046 | 6/1936 | Sweden | 340/134 |
| 604736 | 4/1978 | U.S.S.R. | 340/134 |
| 845931 | 8/1960 | United Kingdom | 340/134 |

*Primary Examiner*—John W. Caldwell, Sr.
*Assistant Examiner*—Tyrone Queen
*Attorney, Agent, or Firm*—Clifford A. Poff

[57] ABSTRACT

Cycle stop-light equipment having a deformable member which is squashed upon operation of the hand-brake lever to operate an electrical switch to illuminate the stop-light.

3 Claims, 1 Drawing Sheet

U.S. Patent  Apr. 11, 1989  4,821,020

CYCLE STOP-LIGHT SWITCHES AND STOP-LIGHT EQUIPMENT

This invention relates to cycle stop-light switches and to cycle stop-light equipment incorporating such switches.

In this Specification, the term "cycle" is to be understood to include pedal bicycles or tricycles, motor cycles, scooters and mopeds and similar machines.

Pedal bicycles and tricycles do not presently carry stop-lights and this constitutes a danger to the rider in that following vehicles have no warning of the cyclist slowing down or stopping.

Even with motor cycles scooters and mopeds, such stop-light as may be provided as actuated via a switch operated by the foot-brake pedal. However, conventional motor-cycling procedure requires that the front brake (which is hand-lever operated) shall be operated in advance of operation of the rear brake by the foot-brake pedal. It follows, therefore, that even though the stop-light is eventually operated upon operation of the foot-brake pedal, this will be at some time after initiation of braking by operation of the front-brake hand lever. Hence, even with such vehicles, the drivers of following vehicles have but a belated warning of the brake application.

Stop-lights have been proposed by cycles which are operated off the hand-brake system but these have depended on the use of electrical switches operated by relative movement of parts of the brake system (such as the wire and casing of a bowden cable) and have necessitated relatively complex switches after exposed to a dirty environment. Consequently, these stop-lights were not reliable and were expensive of construction with the result that they have never achieved commercial success.

The present invention seeks to obviate the disadvantages of the previous proposals and to offer a more commercially viable stop-light equipment by, particularly, a form of switch which can not only be cheap to manufacture but can be reliable in operation and can give the earliest of indications of a brake application.

The present invention accordingly provides a cycle stop-light switch comprising a hollow resiliently deformable member having a pair of electrical contacts held out of contact one with the other whilst the member is undeformed, the member being mountable on a cycle in relation to a hand-brake lever of the cycle so as to be deformed by manual operation of the lever to apply the brakes by such deformation to bring the pair of contacts into contact one with the other.

The electrical contacts may each comprise an electrically conductive strip mounted one in each of opposed internal faces of the member which are spaced apart on the undeformed condition out of engagement one with the other.

The member may be mountable upon the brake lever on the outside thereof such that on manual operation of the lever the member is squashed against the brake lever in the process of operating the brake lever to apply the brake.

The present invention also provides cycle stop-light equipment comprising a switch of which the pair of contacts are connected in circuit with a battery and a red light. Such equipment may include two switches the pairs of contacts of which are connected in parallel with each other in the circuit.

One embodiment of the present invention will now be described in greater detail, by way of example only, with reference to the accompanying drawings of which:-

Figure 2:
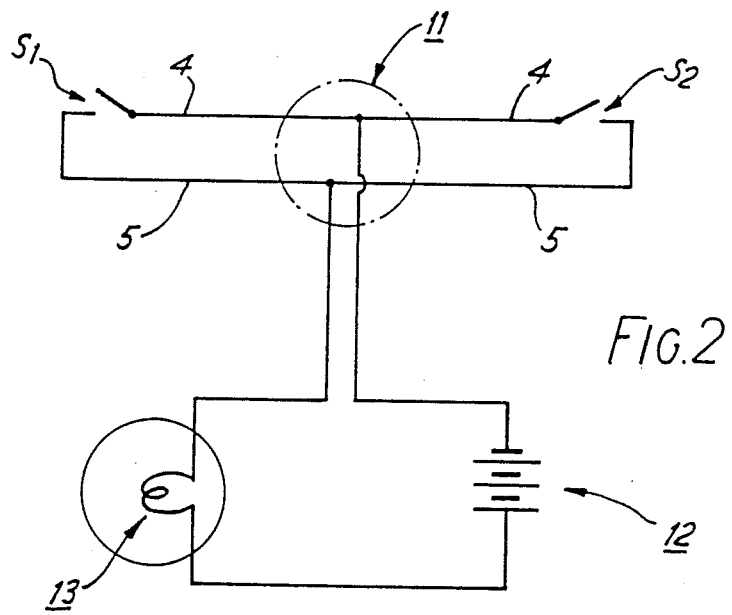

FIG. 1 is a cross-sectional view of a stop-light switch mounted on a hand-brake lever, and FIG. 2 is the electrical circuit diagram.

Referring to FIG. 1, the switch comprises a closed generally tubular-shaped moulded member 1 which can be seen in longitudinal cross-section in the Figure. The member 1 has opposed internal faces 2 into which are mounted opposed flexible copper strips 3 constituting a pair of electrical contacts. Connected one to each of the strips 3 are wires 4 and 5 which permit external electrical connection to the strips 3. The member 1 has integrally moulded with it a pair of loops 6 through which can be threaded a hand-brake lever 7.

The member 1 and loops 6 are a one-piece moulding made from any suitable synthetic or natural plastic resilient material of sufficient rigidity as normally to hold the copper strips 3 out of contact one with the other in the undeformed condition of the member 1 as shown in FIG. 1 whilst being readily manually resiliently deformable when the lever 1 is pulled in the direction of arrow "X" to apply the brake associated therewith, to bring the strips 3 into contact one with the other upon the member 1 being squashed between the cyclist's hand and the hand-brake lever 7.

It will thus be seen that the member 1 with its strips 3 constitute an electrical switch with connecting wires 4 and 5.

In the case of a pedal bicycle with both its rear and front brakes being operable by handlebar-mounted hand-brake levers, such a switch is preferably mounted on each lever. In this case, th necessary electrical circuit to complete the equipment is shown in FIG. 2. Here are shown the two switches S, and S2 which are electrically connected in parallel one to the other by their respective wires 4 and 5 and, through a T-junction connector 11, in electrical series with battery 12 and the bulb of a red lamp 13 mounted on the rear of the bicycle.

From the above description, it will readily be seen that the member 1 with the strips 3 provide not only an electrical switch which is cheap to manufacture but one which is sealed against environmental contamination and damage. Moreover, by its position of mounting on the bake lever, the switch will be "made" so as to illuminate the stop-light 13 even fractionally before the brake is applied.

For motor-cycles and similar machines which conventionally have a foot-pedal operated rear brake, by providing the switch and circuitry of the present invention, earlier warning of a potential or actual brake application will be given to the drivers of following vehicles than is presently the case where the stop-light is operated from the foot brake mechanism.

The batteries 12 may be provided from a separate power-pack clipped to the frame of the cycle, may be incorporated in the stop-light lamp 13 or may be the batteries used for the cycle's conventional lighting.

Whilst the switch as above described is constituted by the member 1 and the strips 3, other forms may be used. For example, the hollow deformable member 1 may not be provided with these strips 3. Instead, the member 1 may merely constitute a closed container in which, upon being squashed, the air pressure therein is increased. In this case, this increase of pressure may be utilised to operate a piston-and-cylinder arrangement or a pressure-sensitive diaphragm which in turn operates a suitable electrical switch.

The member 1 could be mounted on the cycle handlebar so as to be between the handlebar and the brake lever and be squashed thereby as the lever is pulled towards the handlebar to apply the brake. However, such an arrangement would not give quite such an early warning of a brake application as does the positioning of the member 1 as above described.

I claim as my invention:

1. A cycle stop-light apparatus including at least one electrical switch comprising a hollow sealed deformable member mounted on the outside of a hand-brake lever, said member having a generally tubular shape so as to extend along a substantial part of the length of the lever, said member having opposed internal faces, a pair of electrically-conductive strips mounted one on each of said opposed internal faces and extending substantially the internal length of the member in the direction of the length of the hand-brake lever, said strips being spaced apart in the undeformed condition of the member out of engagement one with the other, the member being deformed upon squashing of the member between the hand of the operator and the hand-brake lever upon manual operation of the hand-brake lever in the process of operating the lever to apply the brakes to bring the strips into contact one with the other, and an electrical circuit including:
   a pair of electrical leads one connected to each of the electrical strips,
   a stop-light, and
   an electrical power source, the switch, the stop-light and the electrical power source being connected in the electrical circuit via the electrical leads such that contacting one with the other of the electrical strips upon squashing of the electrical switch illuminates the stop-light.

2. The cycle stop-light apparatus as claimed in claim 12 wherein the member has integral therewith resilient loops through which the brake lever can be threaded to mount the member on the brake lever.

3. A cycle stop-light apparatus as claimed in claim 1 further including a second electrical switch comprising a hollow sealed deformable member mounted on the outside of a second hand-brake lever so as to extend along a substantial part of the length thereof, said second member having opposed internal faces, a pair of electrically-conductive strips mounted one on each of the opposed internal faces and extending substantially the internal length of the second member in the direction of the length of the second hand-brake lever, said strips being spaced apart in the undeformed condition of the second member out of engagement with one another, the second member being deformed upon squashing of the second member between the hand of the operator and the second hand-brake lever upon manual operation of the second hand-brake lever in the process of operating the lever to apply the brakes to bring the strips into contact one with the other, the electrical contacts of said at least one electrical switch and said second electrical switch being connected in parallel to each other in said circuit.

* * * * *